United States Patent
Quast

(10) Patent No.: US 7,628,441 B2
(45) Date of Patent: Dec. 8, 2009

(54) ADJUSTING SYSTEM FOR A VEHICLE SEAT

(75) Inventor: Ingo Quast, Coburg (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 0 days.

(21) Appl. No.: 11/997,400

(22) PCT Filed: Dec. 8, 2006

(86) PCT No.: PCT/EP2006/011804

§ 371 (c)(1),
(2), (4) Date: Mar. 12, 2008

(87) PCT Pub. No.: WO2007/118505

PCT Pub. Date: Oct. 25, 2007

(65) Prior Publication Data
US 2009/0026822 A1    Jan. 29, 2009

(30) Foreign Application Priority Data
Mar. 30, 2006  (DE) .................. 20 2006 005 103 U

(51) Int. Cl.
*B60N 2/08* (2006.01)
(52) U.S. Cl. .................. 296/65.13; 297/341; 248/429
(58) Field of Classification Search .............. 296/65.13, 296/65.14, 65.01; 297/341; 248/429, 430
See application file for complete search history.

(56) References Cited

U.S. PATENT DOCUMENTS

| 4,671,571 A | * | 6/1987 | Gionet | 297/341 |
| 5,605,377 A | * | 2/1997 | Tame | 297/341 |
| 5,641,145 A | * | 6/1997 | Droulon et al. | 248/429 |
| 5,688,026 A | * | 11/1997 | Reubeuze et al. | 297/341 |
| 6,098,946 A | * | 8/2000 | Sechet et al. | 248/424 |
| 6,227,596 B1 | * | 5/2001 | Foucault et al. | 296/65.13 |
| 6,767,063 B1 | * | 7/2004 | Abdella et al. | 297/378.12 |
| 6,945,607 B2 | * | 9/2005 | Kojima | 297/341 |
| 7,097,250 B2 | * | 8/2006 | Rausch et al. | 297/341 |
| 7,195,303 B2 | * | 3/2007 | Nihonmatsu et al. | 296/65.13 |
| 7,300,091 B2 | * | 11/2007 | Nihonmatsu et al. | 296/65.13 |

FOREIGN PATENT DOCUMENTS

| DE | 202004011388 | 11/2005 |
| EP | 1046536 | 10/2000 |

* cited by examiner

Primary Examiner—Dennis H Pedder
(74) Attorney, Agent, or Firm—Scott T. Weingaertner; Joseph D. Eng, Jr.; King & Spalding, LLP

(57) ABSTRACT

The invention relates to an adjusting system for a vehicle seat, wherein the adjusting system includes a bottom rail that is attached to the vehicle, a top rail that can be rigidly attached to the seat and that can move along the bottom rail, and a memory module that is attached alternately to the seat or to the vehicle and that can move along the bottom rail. The memory includes a movable safety catch for forming a positional locking mechanism with the bottom rail, and a means for forming a positional locking mechanism with a movable seat-mounted control lever. The safety catch can be actuated by the seat-mounted control lever and is mounted in a cam-controlled manner so as to be able to rotate in an open bearing.

18 Claims, 7 Drawing Sheets

Fig. 3A
Fig. 3B
Fig. 3C
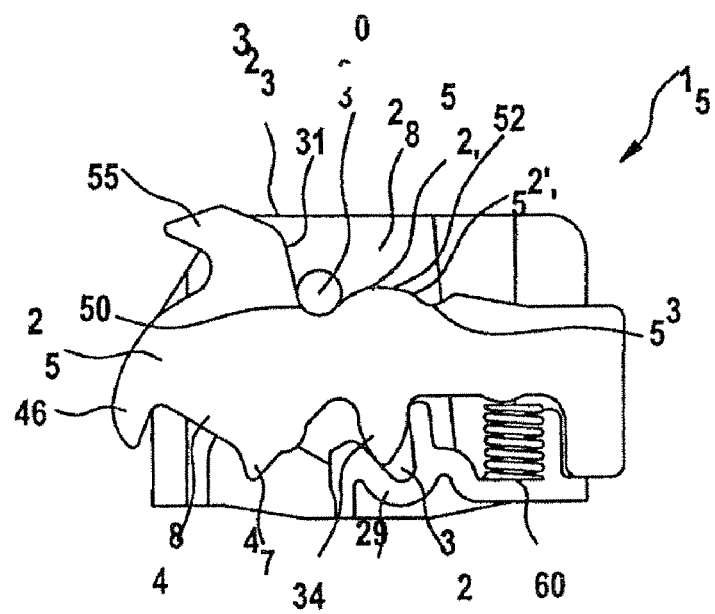
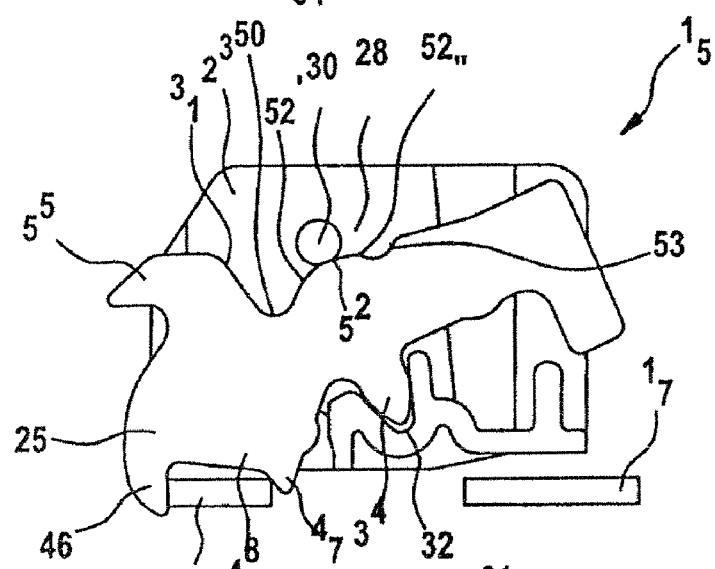
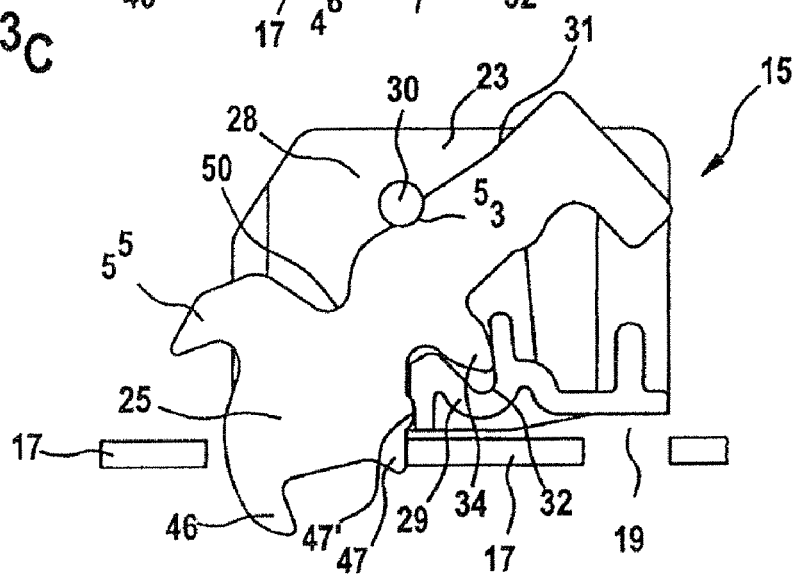

ADJUSTING SYSTEM FOR A VEHICLE SEAT

BACKGROUND OF THE INVENTION

The invention relates to an adjusting system for a vehicle seat according to the preamble of claim 1. An adjusting system for a vehicle seat of this type is known in DE 20 2004 011 388 U1 and comprises a bottom rail which can be rigidly attached to the vehicle and a top rail which can be attached to the vehicle seat and can move along the bottom rail. The fact that the top rail can move along the bottom rail allows the vehicle seat, which is connected to the top rail, to be adjusted in the longitudinal direction of the rails. The adjusting system also has a memory module which is attached alternately to the seat or to the vehicle and comprises a movable safety catch for forming a positional locking mechanism with the bottom rail, as well as means for forming a positional locking mechanism with a movable seat-mounted control lever, wherein the safety catch can be actuated by the seat-mounted control lever.

The memory module serves mechanically to store a set longitudinal position of the seat when the vehicle seat has temporarily to be adjusted longitudinally. Such temporary longitudinal adjustment of a vehicle seat is, for example, necessary in two-door cars or in minibuses to help a passenger in the rear of the vehicle to climb in or out.

To store the set longitudinal position of the seat, the movable seat-mounted control lever is coupled to an actuating mechanism for the temporary longitudinal displacement of the vehicle seat, such as an entry or exit mechanism. If the vehicle seat is displaced longitudinally to allow a passenger to climb in or out, the control lever leaves its catching or latching position which it forms with the memory module, thus uncoupling the memory module from the vehicle seat. At the same time, the safety catch of the memory module is actuated for forming a positional locking mechanism with the bottom rail. In other words, during temporary longitudinal displacement of the vehicle seat, the memory module is stationarily deposited on the bottom rail. The preset longitudinal position of the seat is stored via the position in which the memory module is deposited on the bottom rail. According to DE 20 2004 011 388 U1, the mechanism for folding over the backrest of the vehicle seat is used as the actuating mechanism triggering the deposition of the memory module.

If, once the memory module has been deposited, the vehicle seat is pushed back again, the control lever thus forms, as a result of an appropriate design in the deposited position, again a positional locking mechanism with the memory module and disengages the positional locking mechanism between the safety catch and the bottom rail. The vehicle seat has resumed its original position.

According to DE 20 2004 011 388 U1, the safety catch of the memory module is configured as a rotary catch which, when actuated accordingly, forms a positional locking mechanism with recesses in the bottom rail. For this purpose, the safety catch either engages with the recesses in the bottom rail by means of locking lugs or receives the webs, located between the recesses, of the bottom rail in a correspondingly configured indentation.

SUMMARY OF THE INVENTION

The object of the invention is further to improve an adjusting system of the type mentioned at the outset.

For an adjusting system according to the invention, this object is achieved in that the safety catch in the memory module is mounted in a cam-controlled manner so as to be able to rotate in rolling bearing, the rolling bearing being formed by a bearing journal which is non-positively linked with an open surface.

The term "positional locking mechanism" refers in the context of the present document to a functional element or a module which temporarily prevents the production of movement of a body. The locking can in this case be produced by engagement and/or by latching. In particular, the positional locking mechanism does not have to be configured symmetrically with regard to the direction of movement. The safety catch of the memory module can thus, for example, be configured in such a way that the positional locking mechanism configured with the bottom rail has a high locking effect in relation to the ascending vehicle seat but only a low locking effect in the opposite direction.

The rolling bearing is formed as an open bearing, which refers to a bearing of the type in which the bearing point or the bearing axis is not fixed, so the bearing point or the bearing axis is able to migrate during the movement. The mounting is carried out by a non-positive fit. In other words, an open bearing has a translatory degree of freedom of the bearing point or the bearing axis.

In a first step, the invention starts from the consideration that the memory module must, for mechanical activation of the seat-mounted control lever, be locked to the bottom rail so as to be able to withstand strong forces of detachment, especially during recovery by the returning vehicle seat. To date, this has been achieved by correspondingly configured stop faces of the rotationally movable safety catch that rest during locking on the webs of the bottom rail. However, the locking of the positional locking mechanism formed from the safety catch and bottom rail can be further improved if the penetration depth of the safety catch or the force with which it is pressed against the bottom rail is intensified. This could be achieved by changing the design of the lever of the safety catch. However, lengthening the lever arm of the safety catch increases the overall volume, and this should be avoided both with regard to the material costs and with regard to the narrow overall space conditions provided in motor vehicles.

In a second step, the invention starts from the consideration that the locking of the positional locking mechanism between the safety catch and bottom rail can be intensified without increasing the overall space if the axis of rotation or the center of rotation of the safety catch is allowed to migrate during the movement of the safety catch. That is to say, in the case of a predetermined safety catch, this allows the lever action of the safety catch, and thus the locking during the sequence of movement thereof, to be influenced. However, this can be brought about by an open bearing which, during the rotational movement of the safety catch, allows translatory movement of the bearing element.

Finally, in a third step, the invention recognizes that an open bearing is, on account of the large number of degrees of freedom, too indeterminate for the desired sequence of movement of the safety catch between a locked and a release position. However, the degrees of freedom of the open bearing can be utilized by introducing a further constraint for configuring a desired sequence of movement of the safety catch. This further constraint is achieved as a result of the fact that the open bearing is cam-controlled. Cam-controlled restricted guidance of the movement of the safety catch in the open bearing allows the sequence of movement of the safety catch to be adapted with regard to the desired requirements, in particular for increasing the holding or opening force of the positional locking mechanism.

The cam control can be carried out by a sliding block guide or by restrained articulation. However, in an advantageous embodiment, a bearing is used for the purposes of cam control. The bearing can in this case be configured, in particular, by a bearing element such as a roller, a roll, a web or a ball, on which the safety catch rolls or slides with restricted guidance during its sequence of movement. It is, in particular, possible for the bearing to be configured as a rolling bearing or as a sliding bearing. However, in a simple and cost-effective variation, the bearing is formed by a round web along which a running edge, in particular the outer edge, of the safety catch slides or rolls or extends. In this case, it is, in particular, not necessary for the round web to be rotatably mounted. It is also conceivable for the running edge of the safety catch to slide past while resting on the round web. The configuration of the running edge allows the desired sequence of movement of the safety catch to be set, in particular with regard to the migration of the center of rotation in order to intensify the holding force of the safety catch.

The open bearing can, for example, be a pivot bearing, the axis of rotation having a degree of freedom for movement perpendicular to the axis of rotation. In particular, the axis of rotation can be inserted in a sliding block guide. Expediently, the open bearing is configured as a rolling or self-aligning bearing in which a bearing journal rolls openly on a seat and/or slides openly along said seat. In the case of a rolling or self-aligning bearing of this type, the journal is non-positively linked to the seat for carrying out reciprocating movements, the point of support of the journal in the seat migrating during the movement. A bearing of this type is relatively simple in its mechanical configuration and can therefore be produced cost-effectively. In addition, it allows additional design freedom, with regard to the configuration of the journal and the seat, for forming the desired sequence of movement.

In an advantageous embodiment, the safety catch is guided between the cam-controlling bearing and a rolling bearing. In this case, the safety catch is guided on one side in a corresponding recess in the rolling bearing so as to be able to oscillate and move within certain limits, the opposing side of the safety catch rolling on the bearing. Interaction with a spring element, which acts on the safety catch for the purposes of triggering the movement and generating the necessary holding force, thus allows generation using cost-effective means of a restrictedly guided sequence of movement of the safety catch such as is required to improve the holding force in the locked position. For the rolling bearing, it is in this case particularly advantageous if the safety catch is mounted, by means of an integrally formed tooth, in a corresponding round recess for forming the weight bearing.

With regard to an improved lever action of the safety catch in the locked position of the safety catch, it is expedient if the round recess, forming the rolling bearing with the corresponding tooth of the safety catch, is remote from the bottom rail. The tooth, which is mounted in the round recess, of the safety catch is thus oriented toward the bottom rail. In this case, one free end of the safety catch, which is mounted between the counter bearing and the rolling bearing, forms in a locked position the positional locking mechanism with the bottom rail, the other end of the safety catch adjoining a prestressed spring element. On actuation of the safety catch from its rest position into its locked position, it is thus easily possible to cause, using an appropriately configured running edge, either the center of rotation, formed by interplay between the counter bearing and rolling bearing, of the safety catch to move away from the end driven by spring force or the locking part engaging with the bottom rail to extend. In the former case, the force of the safety catch acting on the bottom rail is intensified. In the latter case, the depth to which the safety catch penetrates the bottom rail is increased.

Advantageously, the round recess is substantially U or V-shaped in its configuration. For a cost-effective embodiment, it is advantageous to configure the safety catch in such a way that, in the event of an impact caused by the returning vehicle seat, the forces acting on the stop faces corresponding to the bottom rail are diverted. In this case, both the open rolling bearing and the cam-controlling bearing are subject to relatively low forces. This allows both the round recess in the rolling bearing and the supporting round web to be made, for example, of plastics material.

In a further expedient embodiment, the bottom rail has openings which are separated from one another by webs and with which the safety catch engages in a first locked position. This embodiment is expedient because the bottom rail generally already has openings which are suitable for guiding a vehicle seat and via which the top rail can be engaged by means of a catch element for fixing a set longitudinal position of the seat. In this way, the bottom rail can be used, without additional constructional parts, both for engaging the top rail and for locking for the memory module. Obviously, it is also conceivable to form the bottom rail separately for locking to the safety catch.

It is also advantageous if the safety catch has an indentation which is arranged between locking lugs and surrounds a web of the bottom rail in a second locked position. Thus, the safety catch can, as a catch element, lead to locking to the bottom rail in a first locked position and additionally lock in an interlocking manner to the indentation in the second locked position, in which it is locked to a web of the bottom rail, through which web the openings in the bottom rail are respectively separated from one another. In the longitudinal direction of the bottom rail, the memory module can thus be deposited in the manner of a catch locking mechanism on the respective openings and in the manner of a latch locking mechanism on the webs respectively separating the openings. This provides additional positions for depositing the memory module between the openings in the bottom rail, thus increasing the resolution with regard to the stored longitudinal position of the seat.

It is also advantageous if the running edge of the safety catch has a first recess for providing support in relation to the round web in a release position and a second recess, which is set apart from the first recess by a collar, for providing support in relation to the round web in the first locked position. This provides bistable mounting of the safety catch between the open bearing or rolling bearing and the round web of the counter bearing. Switching over between the two positions requires the use of a certain amount of energy, as a counter-force has to be applied to overcome the collar arranged between the recesses. When the memory module is deposited on the bottom rail, the collar is overcome by means of the spring force acting on the safety catch. As the returning vehicle seat ascends, the collar located between the recesses prevents the safety catch from rotating toward the release position, so the memory module is protected more effectively from accidental movement in relation to the bottom rail in a locked position of the safety catch.

The memory module comprises means for forming a positional locking mechanism with the seat-mounted control lever. These means are necessary to enable the memory module to move, in a release position of the safety catch, along with the vehicle seat in the longitudinal direction of the rails. Advantageously, the memory module has, as a means for forming a positional locking mechanism with the control lever, a recess for receiving at least a portion of the control lever. There is no need for a complex configuration of the positional locking mechanism between the memory module and the control lever, as the memory module is easily able to move along the bottom rail in the release position of the safety catch. A recess in which at least a portion of the control lever is received is therefore sufficient to establish an adequate link between the memory module and the vehicle seat. In addition, entrainment of the memory module can be brought about by a stop face or a stop element of the top rail, so that as the vehicle seat returns toward the memory module, the memory module is pushed on by the top rail.

For triggering or actuating the control lever which is connected to an actuating mechanism in the vehicle seat, the memory module advantageously has a first control ramp along which the control lever can be guided. The control ramp can in this case be configured either as an edge or as a surface. In particular, it is beneficial to configure the recess as part of the first control ramp, so the control lever is actuated in a sequence of movement as it ascends onto the control ramp and, on reaching the recess, interacts with the memory module as a positional locking mechanism.

In a particularly advantageous embodiment, the recess is, in particular, configured as part of the first control ramp in such a way that the control lever, on reaching the recess, leads to releasing actuation of the safety catch. In this case, the control lever, which enters the recess, counteracts the movable safety catch in such a way that its end forming a positional locking mechanism with the bottom rail is moved out of the interlocking or the engagement. In this case, the control lever counteracts, in particular, a spring force actuating the safety catch.

A compact and cost-effective design can be achieved if the safety catch is guided in a pocket-like receptacle formed by a first and by a second wall surface, the round web being mounted so as to connect the first and the second wall surface, the round recess in the rolling bearing being arranged between the first and the second wall surface, and the first control ramp being formed by the upper edge of a wall surface.

The adjusting system can be used not only for a vehicle seat, the backrest of which can be folded against the seat surface. It is equally conceivable, for facilitating entry or exit, to move the vehicle seat with a fixed backrest, wherein a distinction must be drawn, for depositing the memory module, between a temporary longitudinal adjustment of the seat of this type and a conventional setting of the longitudinal position of the seat. This can be carried out, for example, using an appropriate actuating element.

However, it is currently common practice to fold, for the purposes of entry or exit, an adjustable backrest of the vehicle seat toward the seat surface, this in itself enlarging the free space within which a passenger is able to move. A clear distinction must in this case be drawn between longitudinal adjustment of the seat for the purposes of setting a comfort position for the driver, for example, and the folding movement of the backrest. Triggering of the folding mechanism of the backrest may thus be interpreted as a desire to climb in or out, whereas standard actuation of the longitudinal adjustment of the seat is taken as the setting of a comfort position.

In the embodiment also known as "easy entry" for facilitating entry or exit of a two-door motor vehicle, such as in particular a coupe, this finding is utilized as a result of the fact that actuation of the mechanism for folding over the backrest causes the top rail carrying the vehicle seat to become disengaged from the bottom rail, so the seat as a whole is longitudinally displaceable and the memory module is deposited on the bottom rail during the longitudinal displacement. In this case, the control lever forming a positional locking mechanism with the memory module is, in particular, linked to the actuating mechanism for folding over the backrest.

For ease of operability and in order to prevent the folded-over backrest from folding back into the entry or exit compartment, a vehicle seat equipped for an "easy entry" function generally has a locking mechanism between the backrest and the seat surface when folded in. In other words, when folded in, the backrest is secured in relation to the seat surface. For this purpose, it is advantageous if the memory module has a second control ramp for guiding a movable seat-mounted comfort lever which is configured in such a way that the comfort lever releases the backrest when folded forward as it ascends onto the second control ramp. For this purpose, the comfort lever is to be linked to the locking mechanism arresting the backrest and seat surface. This function has the advantage of allowing the proposed vehicle seat to return in a single sequence of movement back to the stored longitudinal position of the seat and the folded-over backrest thereby to be set upright in the course of the movement.

Advantageously, the second control ramp is formed integrally with or abuts the wall surface forming the first control ramp. This embodiment leads to a small and cost-effective design, especially as in this case the comfort lever and the control lever can be arranged next to each other on a common axis.

As the ascending of the control lever onto the control ramp brings about a torque, releasing the safety catch from the bottom rail, of the memory module, it is advantageous if the second control ramp is formed by the upper edge of a movable rocker which is stationarily articulated by means of a first pivot joint of the memory module and the free end of which is connected to the movable safety catch via a second pivot joint. In this way, the ascending comfort lever moves the rocker toward the bottom rail, so the safety catch connected to the free end of the rocker is accordingly pressed against the bottom rail, intensifying the holding force. In this way, the ascending vehicle seat reliably prevents accidental displacement of the memory module out of its deposited and locked position.

Advantageously, the second pivot joint is arranged at a flat end of the rocker with the second control ramp rising. This embodiment brings about a beneficial transmission of force from the comfort lever, pressing against the control ramp, to the safety catch.

Finally, in an expedient embodiment, the rocker abuts a wall surface so as to be able to rotate by means of the first pivot joint, the rocker being connected to the safety catch via the second pivot joint through a circular arc-shaped opening in the wall surface. A particularly compact design of the memory module is thus achieved. No complex coupling elements are required between the rocker and the safety catch. The control lever, which is for example connected to the mechanism for folding the backrest of the vehicle seat, and the comfort lever, which releases the folded-forward backrest from the seat surface as it ascends onto the second control ramp, can also be movably arranged next to each other on a common axis, saving both costs and space. The first control ramp is formed by the upper edge of a wall of the memory module, which the rocker, the upper edge of which forms the second control ramp, rotatably abuts.

BRIEF DESCRIPTION OF DRAWINGS

FIG. 3A is an opened view of a memory module with a safety catch guided between a rolling bearing and a counter bearing in a release position.

FIG. 3B is an opened view of the memory module according to FIG. 3A, the safety catch being in a first locked position.

FIG. 3C is an opened view of the memory module according to FIG. 3A, the safety catch being in a second locked position.

DETAILED DESCRIPTION OF THE INVENTION

Figure 7:
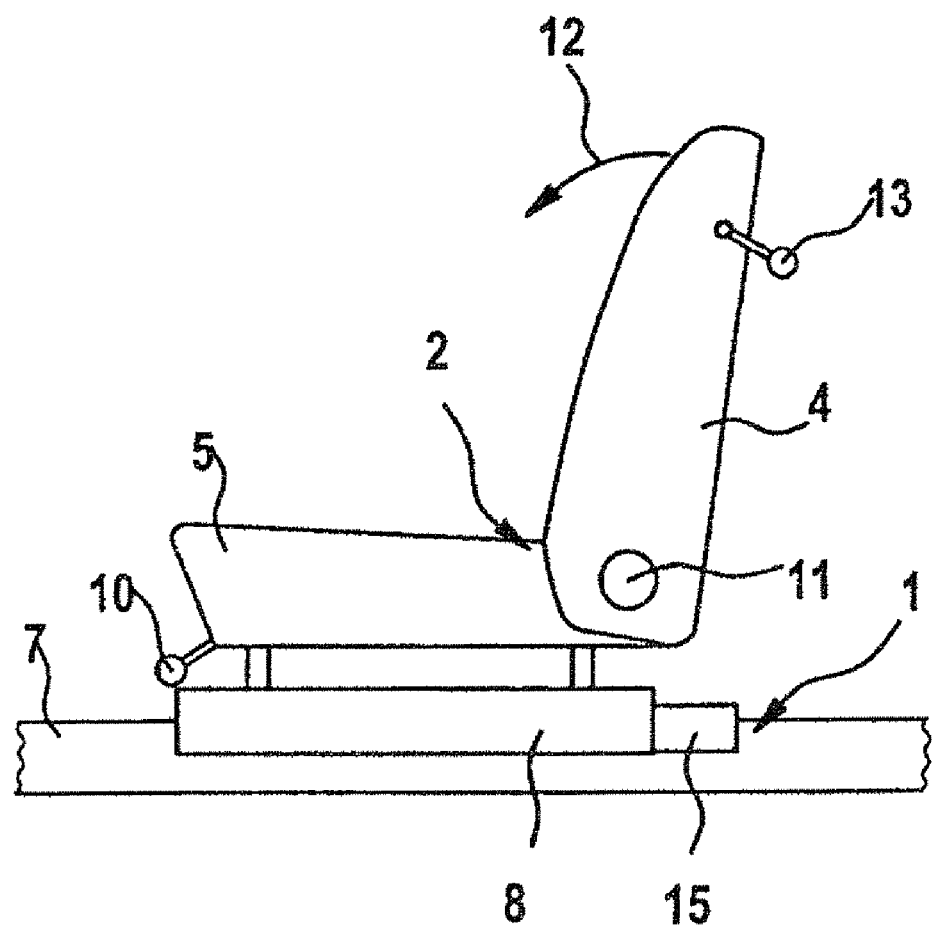
FIG. 7 is a schematic view of a vehicle seat having an "easy entry" function.

To illustrate an "easy entry" function, FIG. 7 shows schematically an adjusting system 1 with a vehicle seat 2 comprising a backrest 4 and a seat bottom part 5. The adjusting system 1 is formed from a bottom rail 7 which is rigidly attached to the vehicle and along which a top rail 8 slides. A locking mechanism (not visible) allows the top rail 8, and thus the vehicle seat 2, to be engaged or locked to the bottom rail 7 at various longitudinal positions of the seat.

To set a desired longitudinal position of the seat, the vehicle seat 2 has an actuating lever 10 which is arranged on the seat bottom part 5 and disengages during actuation the locking mechanism between the top rail 8 and bottom rail 7. After disengagement, the top rail 8 of the vehicle seat 2 can be moved along the bottom rail 7 to a desired longitudinal position of the seat, where it can be fixed by releasing the actuating lever 10 while relocking the top rail 8 to the bottom rail 7.

The backrest 4 is connected to the seat bottom part 5 so as to be able to move in rotation by means of a fastening axis 11. In particular, the backrest 4 can be folded forward by means of the fastening axis 11 toward the seat bottom part 5 in the direction indicated by the arrow 12. An actuating lever 13 is provided for triggering the mechanism for actuating folding-over of the backrest 4.

For storing a preset longitudinal position of the seat, the top rail 8 also has assigned to it a memory module 15, 15' which, in the case of a standard longitudinal adjustment of the seat, slides along the bottom rail 7, together with the top rail 8, while being attached to the seat. To perform an "easy entry" function of the vehicle seat 2, the backrest 4 is mechanically connected both to the locking mechanism bringing about the engagement between the top rail 8 and the bottom rail 7 and to a triggering mechanism for depositing the memory module 15 on the bottom rail 7. If the actuating lever 13 is triggered and the backrest 4 subsequently folded forward toward the seat bottom part 5 in the direction indicated by the arrow 12, the top rail 8 and the bottom rail 7 are disengaged via the mechanical coupling produced, for example, by means of a Bowden wire. At the same time, the triggering mechanism is actuated and the memory module 15 deposited on the bottom rail 7 in the preset longitudinal position of the seat. The position in which the memory module 15 is deposited is fixed in relation to the bottom rail 7 by a positional locking mechanism. The preset comfort position is thus stored by way of the position in which the memory module is deposited, in the event of temporary longitudinal displacement of the vehicle seat 2, especially for purposes of climbing in or out.

If the vehicle seat 2 is subsequently returned again, correspondingly configured coupling elements cause the memory module 15 again to be received, at the preset longitudinal position of the seat, by the vehicle seat 2, the top rail 8 being re-engaged with the bottom rail 7 at the original position and the backrest 4 being folded back.

The mode of operation and the configuration of the coupling elements forming the triggering mechanism for depositing the memory module 15 will be described hereinafter with reference to FIGS. 1 to 6.

Figure 1A:
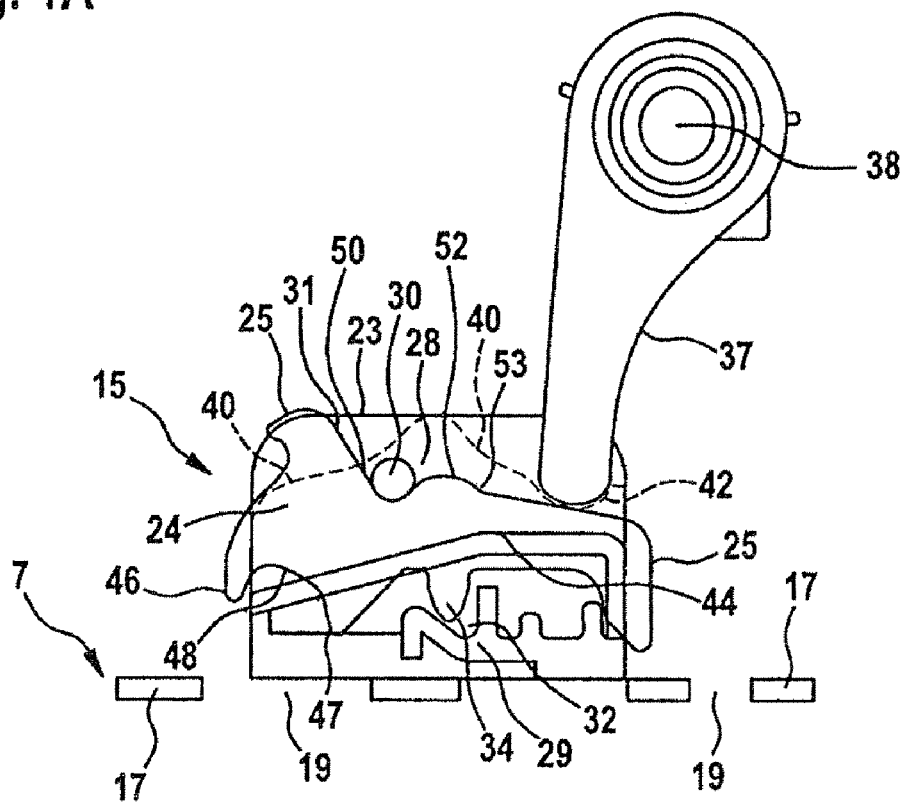
FIG. 1A is a semi-transparent view of a memory module in a seat-mounted position, linked to a control lever.

For this purpose, FIG. 1A is first of all a semi-transparent view of a memory module 15 in a position linked to the vehicle seat 2 according to FIG. 7. The top rail 8 according to FIG. 7 cannot be seen in this view. Of the bottom rail 7, webs 17, between which respective openings 19 are formed, may be seen in cross section. For locking the top rail 8 to the bottom rail 7, correspondingly configured catch elements engage with these openings 19. In the seat-mounted position shown, the memory module 15 can easily slide along the bottom rail 7.

The memory module 15 comprises, as its basic elements, a first wall 23 located behind the drawing plane and a second wall 24 located in front of the drawing plane, between which a safety catch 25 is movably inserted in a pocket-like manner. In this case, the safety catch 25 is guided between a bearing 28 and a rolling bearing 29.

The bearing 28 is formed by a round web 30 on which a running edge 31 of the safety catch 25 rests or rolls or slides along. The rolling bearing 29 which is arranged in relation to the bearing 28 comprises a round recess 32 in which a tooth 34 of the safety catch 25 is mounted. The tooth 34 and the round recess 32 form the rolling bearing 29. When the safety catch 25 moves, the tooth 34 moves along in the round recess 32 in a rolling and/or sliding manner. Translatory displacement in the longitudinal direction of the tooth is also facilitated. The mounting of the safety catch 25 between the bearing 28 and the rolling bearing 29 produces, in interplay between the running edge 31 and the shaping of the tooth 34 or the round recess 32, a defined sequence of movement of the safety catch 25 between the illustrated release position and a locked position, as will be illustrated in particular by the following drawings.

To trigger the safety catch 25, use is made of a spring element 60 which may be seen from FIG. 3A and rests from below against the lever arm, located in FIG. 1A to the right of the rolling bearing 29, of the safety catch 25.

To facilitate understanding of the mode of operation of the memory module 15, FIG. 1A also shows a control lever 37 which is rigidly connected to a vehicle seat not shown in this diagram (for example, the vehicle seat 2 according to FIG. 7) so as to be able to move in rotation via an axis 38. The control lever 37 interacts, in particular, with a first control ramp 40 formed by the upper edge of the first wall 23 of the memory module 15. In the illustrated seat-mounted position of the memory module 15, the free end of the control lever 37 engages with a recess 42 in the first control ramp 40. This positive fit links the memory module 15 to the control lever 37 and thus to the vehicle seat. In the illustrated position, the memory module 15 moves with the control lever 17 or with the vehicle seat along the bottom rail 7. At the same time, the free end of the control lever 37 presses, in the illustrated position within the recess 42, against the lever, arranged to the right of the rolling bearing 29, of the safety catch 25 and thus against the spring element 60. The safety catch 25 is in its release position.

The memory module 15 further comprises a second control ramp 44 which abuts the second wall 24. This second control ramp 44 promotes interaction with a comfort lever provided for releasing a folded-forward backrest from a seat bottom part (see FIG. 7).

The safety catch 25 also has, on its lever arm arranged to the left of the rolling bearing, a first locking lug 46 and a second locking lug 47 between which an indentation 48 is formed. Both the two locking lugs 46 and 47 and the indentation 48 promote locking interaction of the safety catch 25 with the openings 19 or with the webs 17 of the bottom rail 7, provided that the safety catch 25 is in a locked position. The running edge 31 of the safety catch 25 has a first recess 50 which, in the illustrated release position, rests against the round web 30 of the bearing 28. Also embossed on the running edge 31 is a collar 52 which spatially separates the first recess 50 from a second recess 53. The second recess 53 promotes engagement of the safety catch 25 in relation to the round web 30 in a first locked position.

Figure 1B:
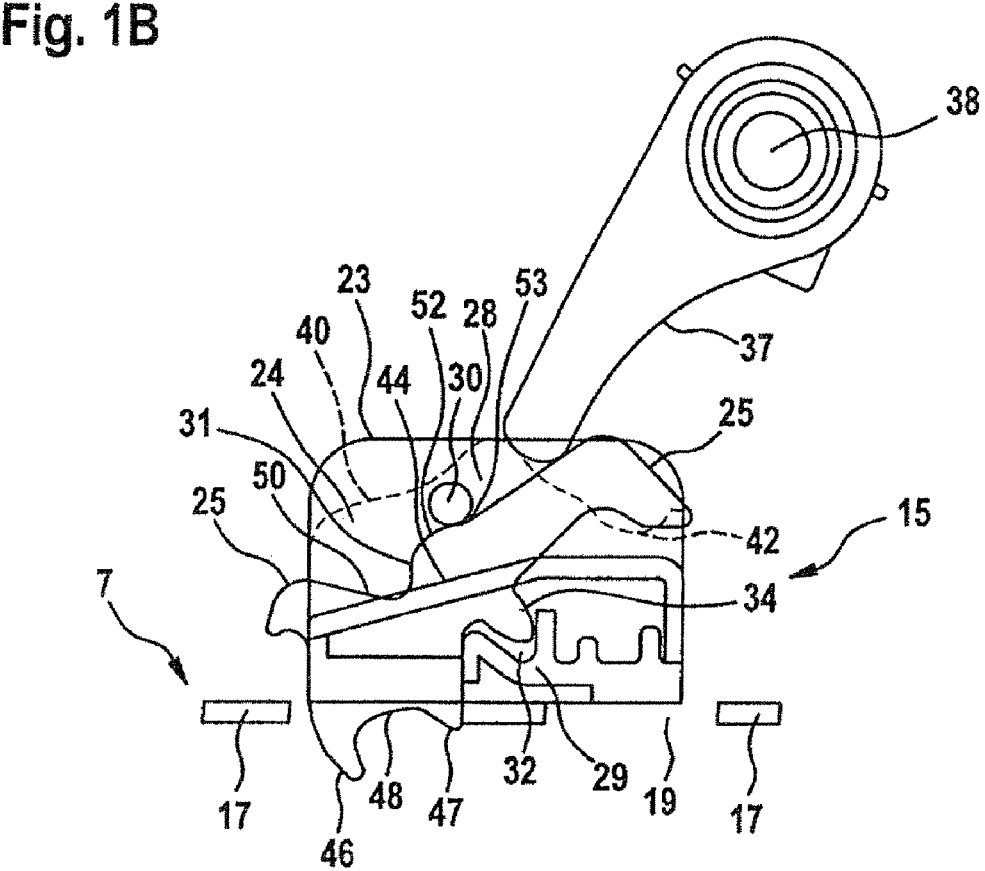
FIG. 1B is a semi-transparent view of the memory module according to FIG. 1A in a position attached to the vehicle with the safety catch engaged.

FIG. 1B is, again, a semi-transparent view of the memory module 15 according to FIG. 1A, although in this case the safety catch 25 is in the first locked position. The movement of the safety catch 25 from the release position according to FIG. 1A into the first locked position according to FIG. 1B is brought about by rotation of the control lever 37 in the clockwise direction. The rotational movement of the control lever 37 is caused by folding-over of the vehicle seat backrest 5 which interacts—in a manner not shown—with the control lever 37 via a Bowden wire. In other words, FIG. 1B shows the deposition of the memory module 15 on actuation of the mechanism for folding over the vehicle seat for the purposes of climbing in or out.

Rotation of the control lever 37 in the clockwise direction allows the lever, located to the right of the rolling bearing 29 in the drawing, of the safety catch 25 to move upward. This movement is carried out because the lever end, located on the right-hand side, of the safety catch 25 is pressed against the recoiling control lever 37 by means of the spring element 60 according to FIG. 3A. Thus, overall, there is anticlockwise rotational movement of the safety catch 25 with respect to FIG. 1A.

During the anticlockwise rotational movement of the safety catch 25, the running edge 31 rolls left toward the round web 23 of the bearing 28. In the position shown in FIG. 1B, this may be seen from the fact that the safety catch 25 now rests with the second recess 53 on the round web 30. The collar 52 has already been exceeded. The free end of the safety catch 25 thus engages deeper into the opening 19 in the bottom rail 7. The configuration of the running edge 31 prevents free movement of the tooth 34 in the round recess 32 in the rolling bearing 29. Instead, the interplay between the bearing 28 and the rolling bearing 29 then causes the tooth 34 to rest, in the position shown in FIG. 1B in relation to the round recess 32, at a point located further toward the left. As a result, the lever arm, located to the right of the rolling bearing 29, of the safety catch 25 has extended, thus bringing about a more intensive force holding the safety catch 25 in relation to the bottom rail 7.

In the illustrated first locked position, the locking lugs 46 and 47 of the safety catch 25 engage with an opening 19 in the bottom rail 7. The memory module 15 is locked in relation to the bottom rail 7. After slight further rotation of the control lever 37, the coupling of the memory module 15 to the vehicle seat is cancelled, so the memory module 15 is now deposited. The vehicle seat can be moved left without the memory module 15 according to FIG. 1B.

FIG. 2A is, again, a semi-transparent view of the memory module 15 according to FIG. 1A, the safety catch 25 being in this case in its second locked position. This second locked position occurs when, on actuation of the backrest, the memory module 15 is positioned on the bottom rail 7 in such a way that a catch locking mechanism by engagement of the safety catch 25 with an opening 19 in the bottom rail 7 is not possible. Instead, the indentation 48 engages on a web 17 of the bottom rail 7. Equipping the safety catch 25 with a first latching lug 46 and a second latching lug 47 and an indentation 48 located therebetween thus allows the memory module 15 to be deposited both on an opening and on a web of the bottom rail 7.

Figure 2A:
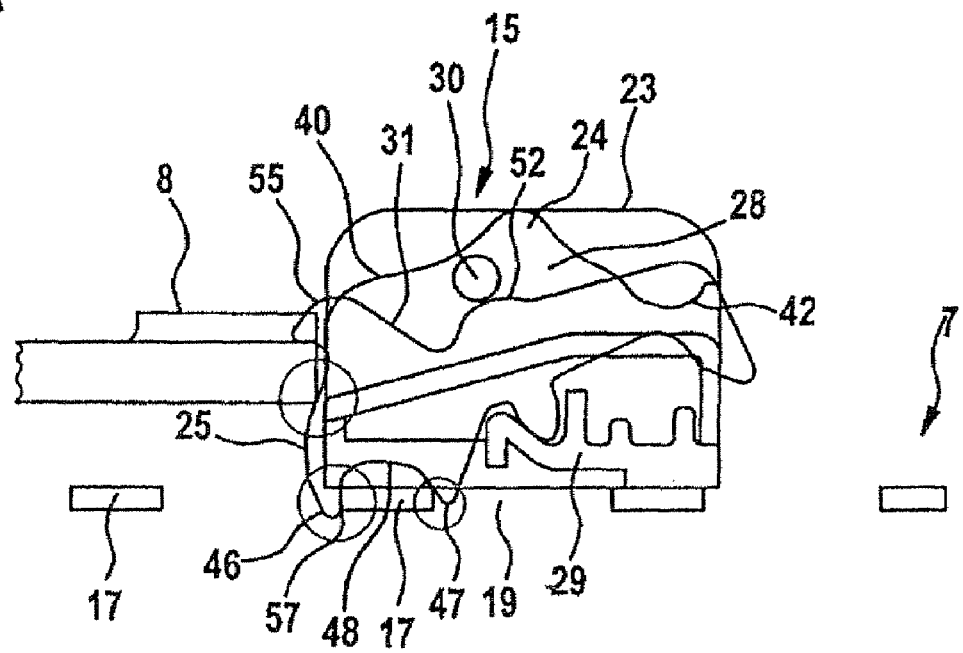
FIG. 2A is a semi-transparent view of the memory module according to FIG. 1A in a position attached to the vehicle with the safety catch engaged immediately prior to receiving by a vehicle seat.

In the second locked position, shown in FIG. 2A, of the safety catch 25, the collar 52 of the running edge 31 rests against the round web 30. In this position, the safety catch 25 is pressed against the web 17 of the bottom rail 7 by a relatively short lever arm located to the left of the round web 30.

Whereas FIG. 1 shows the deposition of the memory module 15 on actuation of a temporary longitudinal adjustment of the seat, FIG. 2A shows the stopping of the returning vehicle seat prior to the recovery of the memory module 15. Also shown for this purpose is a portion of the top rail 8 which is rigidly attached to the seat and strikes the safety catch 25, coming from the left-hand side. In this case, in the illustrated second locked position of the safety catch 25, the geometry of the returning top rail 8 prevents it from striking the stop lug 55 of said safety catch. Instead, it strikes the safety catch 25 at a point between the stop lug 55 and the first locking lug 46. As a result of the configuration of the safety catch 25, this leads to pressing of the lever, located to the left of the rolling bearing 29, of the safety catch 25 against the web 17. Provided for this purpose is a flat stop face 57 of the first locking lug 46 that can rest two-dimensionally against the web 17. This prevents striking of the top rail 8 against the memory module 15 from leading to detachment of said memory module from the bottom rail 7. Moreover, the end of the safety catch 25 that is located to the right of the rolling bearing 29 is provided with a straight stop edge which is the rear seat stop.

Figure 2B:
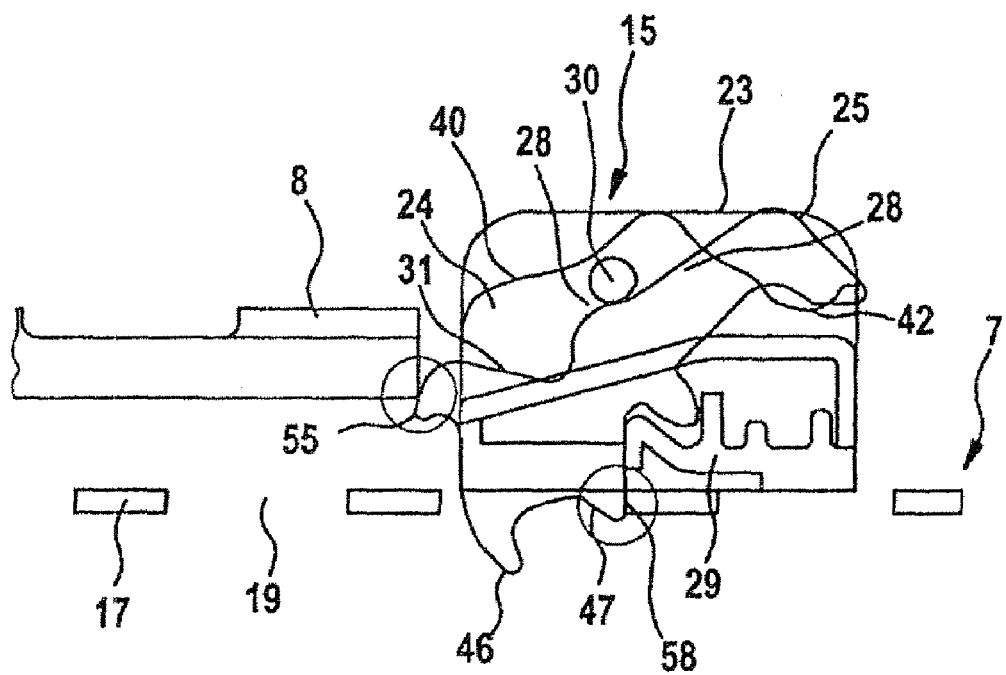
FIG. 2B is a semi-transparent view of the memory module according to FIG. 1A in a position attached to the vehicle with the safety catch engaged immediately prior to receiving by the vehicle seat.

FIG. 2B shows the same situation with the returning top rail 8, although in this case the safety catch 25 is in the first locked position which may also be seen from FIG. 1B. In this case, the returning top rail 8 strikes the top of the stop lug 55. This also leads to a downwardly oriented force, which is absorbed by a flat stop face 58 of the second locking lug 47, acting on the safety catch 25. The flat stop face 58 rests for this purpose against a web 17 of the bottom rail 7.

For the sake of clarity, FIG. 3 is, again, an opened view of the memory module 15. Compared to FIGS. 1 and 2, the front or second wall 24 has been removed.

FIG. 3A shows the memory module 15, the safety catch being in a release position. The opened view shows the bearing formed by the round web 30 and the running edge 31 and the rolling bearing 29 comprising the round recess 32 and the tooth 34.

The round recess 32 in the rolling bearing 29 is formed by a plastics material web inserted between the first wall 23 and the second wall 24 of the memory module 15. A spring element 60, which acts in relation to the lever arm, arranged to the right of the rolling bearing 29, of the safety catch 25, is mounted in an extension of this web. In order to prevent slipping of the spring element 60 in relation to the safety catch 25, an appropriate collar is arranged at this location. FIG. 3A also shows that the collar 52 differs from a round form in terms of a left corner 52' and in terms of a slightly raised right corner 52", the function of which is apparent from FIG. 3B.

FIG. 3B is an opened view of the memory module 15, the safety catch 25 being in its second locked position, the indentation 48 being engaged with a web 17 of the bottom rail 7. It may clearly be seen from this view that, in this position, the safety catch 25 rests with the collar 52 of its running edge 31 against the round web 30. Accordingly, the tooth 34 is lowered into the round recess 32. The left corner 52' and the right corner 52" of the collar 52 prevent in this case the safety catch 25 from sliding along the round web 30. Desired clamping is thus achieved as the set-back vehicle seat ascends. The round web 30 becomes in this case the new center of rotation of the safety catch 25.

FIG. 3C is an opened view of the memory module 15, the safety catch 25 being in its first locked position. In this case, the front part of the safety catch 25 engages with an opening 19 in the bottom rail 7 in the manner of a catch locking mechanism. In this position, the safety catch 25 rests with the second recess 53 in its running edge 31 against the round web 30 of the bearing 23. The position of the tooth 34 in the round recess 32 is changed accordingly. As may also be seen, the second locking lug 47 has a radius 47' which prevents the safety catch 25 from advancing as the vehicle seat ascends.

Figure 4A:
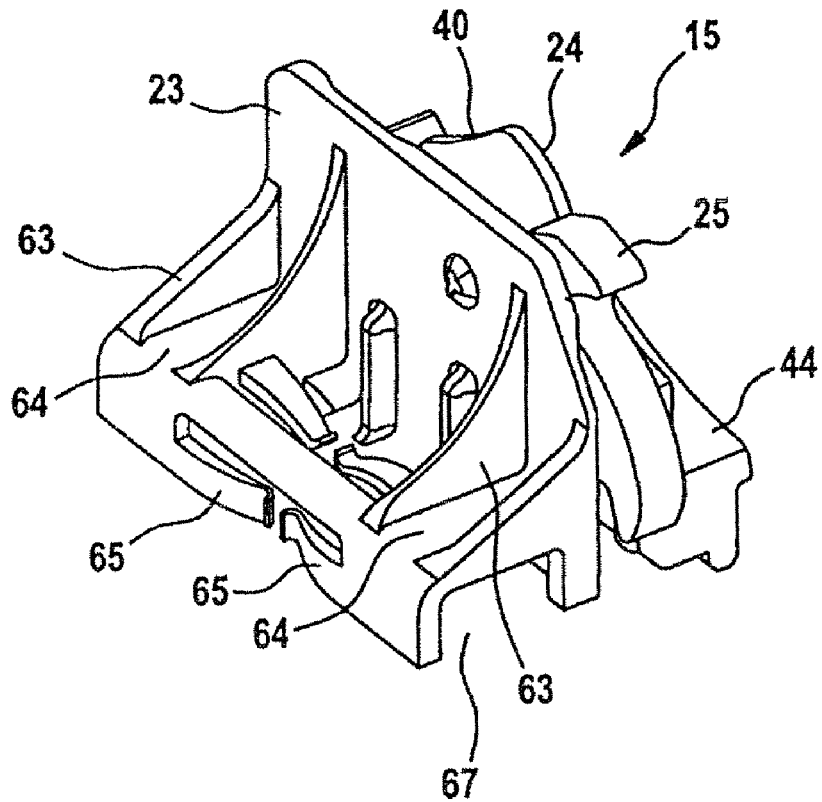
FIG. 4A is a perspective view of a memory module.

FIG. 4A is a perspective view of the memory module 15. The illustrated perspective then clearly shows the rear or first wall 23 of the memory module 15. The back of the first wall 23 is provided with stiffeners 63 which prevent the memory module 15 from falling out or bending. Also shown is the safety catch 25 inserted between the first wall 23 and the second wall 24. The front edges of the first wall 23 and the second wall 24 are slightly expanded to allow easy insertion of the first locking lug 46 and the second locking lug 47. In particular, this prevents clamping in the event of burrs forming on the edges of the safety catch 25 such as may occur, for example, in the case of a safety catch 25 configured as a cast part. The upper edge of the second wall 24 is clearly configured as a first control ramp 40. A wide second control ramp 44, which is used to guide a comfort lever, abuts the second wall 24.

An overlap 64, which promotes guidance in a guide element along the bottom rail, is also arranged on the back of the first wall 24. For this purpose, the overlap 64 is attached to the corresponding guide element, the spring legs 65 ensuring appropriate clamping. The memory module 15 is thus securely guided on a guide element of the bottom rail 7, which is inserted into the overlapped opening 67, by means of the overlap 64 and the spring legs 65 arranged to the side and above. The lateral and upper spring legs 65 prevent, in particular, rattling of the memory module 15 on the guide rail.

Figure 4B:
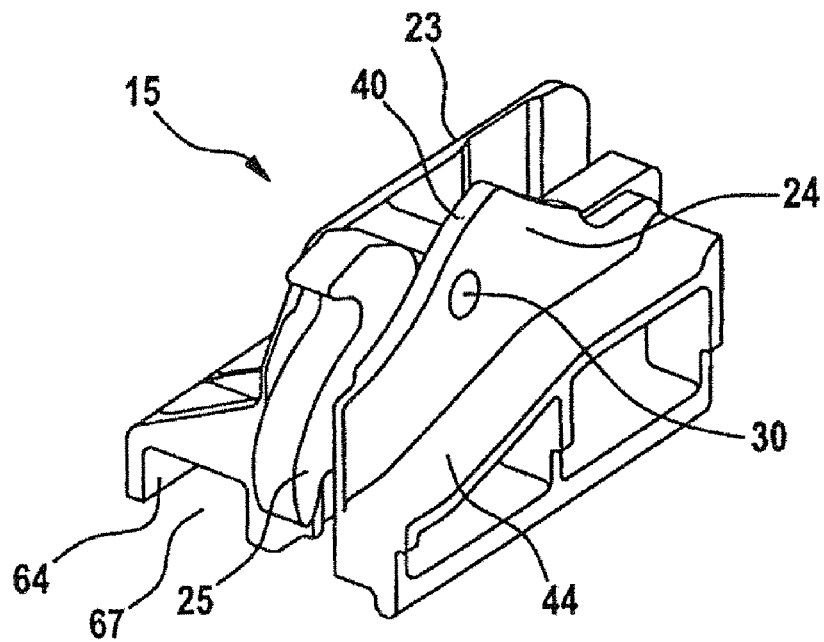
FIG. 4B is a perspective view of the memory module according to FIG. 4A from a different viewing angle.

FIG. 4B is a perspective view of the memory module 15 according to FIG. 4A from a different viewing angle. This view looks onto the second wall 24. The pocket-like design of the memory module 15 may be seen, the safety catch 25 being inserted between the first wall 23 and the second wall 24. The round web 30 is inserted between the first wall 23 and the second wall 24 for forming the bearing 32.

FIG. 4B clearly shows that the second wall 24 is abutted by a second control ramp 44 used to guide a comfort lever which is provided to release the folded-forward back rest 4 from the seat bottom part 5 of a vehicle seat 2 according to FIG. 7.

FIG. 5 shows schematically the interplay between the memory module 15 and the seat-mounted releasing or receiving mechanism for depositing or for receiving the memory module 15.

An angle bracket 70, to which the control lever 37 and a comfort lever 72 are fastened so as to be able to rotate in a bearing axis 71 and which is rigidly attached to the seat, is shown in this diagram as part of the releasing mechanism.

Figure 5A:
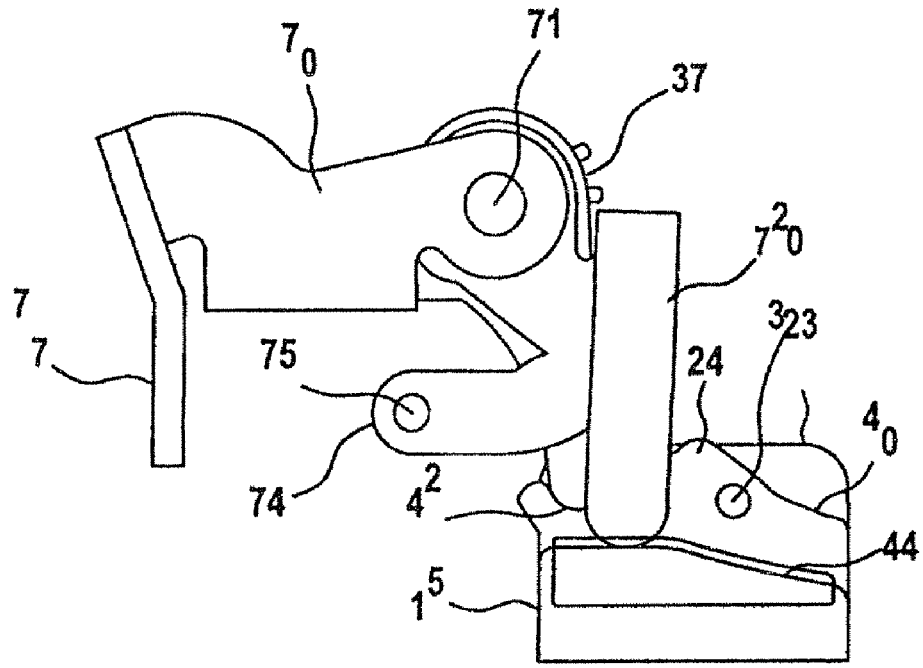
FIG. 5A shows a seat-mounted angle bracket with a control lever and a comfort lever in a position in which the control lever and the angle bracket of the memory module have ascended.

FIG. 5A shows the position of the angle bracket 70 or the vehicle seat in which the memory module 15 is rigidly connected to the vehicle seat. This may be seen from the fact that the leading end of the control lever 37 according to FIG. 1A is in the recess 42 in the second wall 24. In this seat-mounted position of the memory module, both the control lever 37 and the comfort lever 72 are in an upright position. The control lever 37 is coupled by a Bowden wire (not shown) to a backrest which can be folded over, so it is moved anticlockwise, in the view illustrated in the present document, when the backrest is folded over. The comfort lever 72 is coupled to a seat bottom part of a vehicle seat according to FIG. 7 by a locking mechanism for arresting the folded-over backrest. For this purpose, the comfort lever 72 has an extended lever arm 74 at the end of which an opening 75 is formed. The sheathed cable of a Bowden wire is fastened in this opening 75, the casing of the Bowden wire resting on the support 77 of the angle bracket 70. In the illustrated upright position of the comfort lever 72, there is no arresting. The locking mechanism has not been triggered.

Figure 5B:
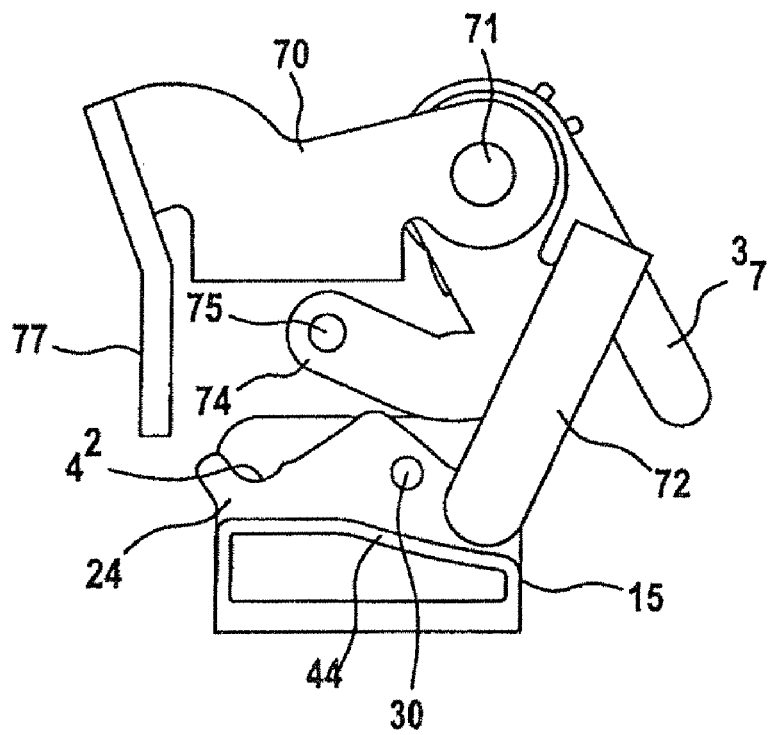
FIG. 5B shows the holding bracket according to FIG. 5A in a position prior to ascending onto the memory module.

FIG. 5B shows the ascending of the vehicle seat, coming from the right-hand side, onto the memory module 15. As the vehicle seat has a comfort function, i.e. arresting of the backrest with the seat bottom part when folded over, the folded backrest in the illustrated position causes the control lever 37 to rotate as the vehicle seat returns. The comfort lever 72 is rotated into the position shown by mechanical prestressing brought about, for example, by an annular or leaf spring arranged about the bearing axis 71 when the vehicle seat is pushed forward.

As the vehicle seat returns, the end of the comfort lever 72 then climbs the control ramp 44 of the deposited memory module 15. In this case, the comfort lever 72 is rotated anticlockwise in the bearing axis 71. This rotational movement increases the distance between the opening 74 and the support 77, thus generating a tensile force in the Bowden wire (not shown) connected to the locking mechanism between the backrest and the seat bottom part. The locking mechanism is released, thus allowing the backrest to be swiveled back into the upright position in relation to the seat bottom part. The control lever 37 is rotated further anticlockwise via the first control ramp 40, and this brings about relocking between the top rail and the bottom rail. The straightening of the backrest 4 then brings the control lever 37 back into the upright position shown in FIG. 5A, in which it finally engages with the recess 42 and presses the safety catch 25 (not shown) into a release position. Ultimately, in the event of or as a result of receiving of the memory module 15, the vehicle seat returns to the preset comfort position.

Figure 6A:
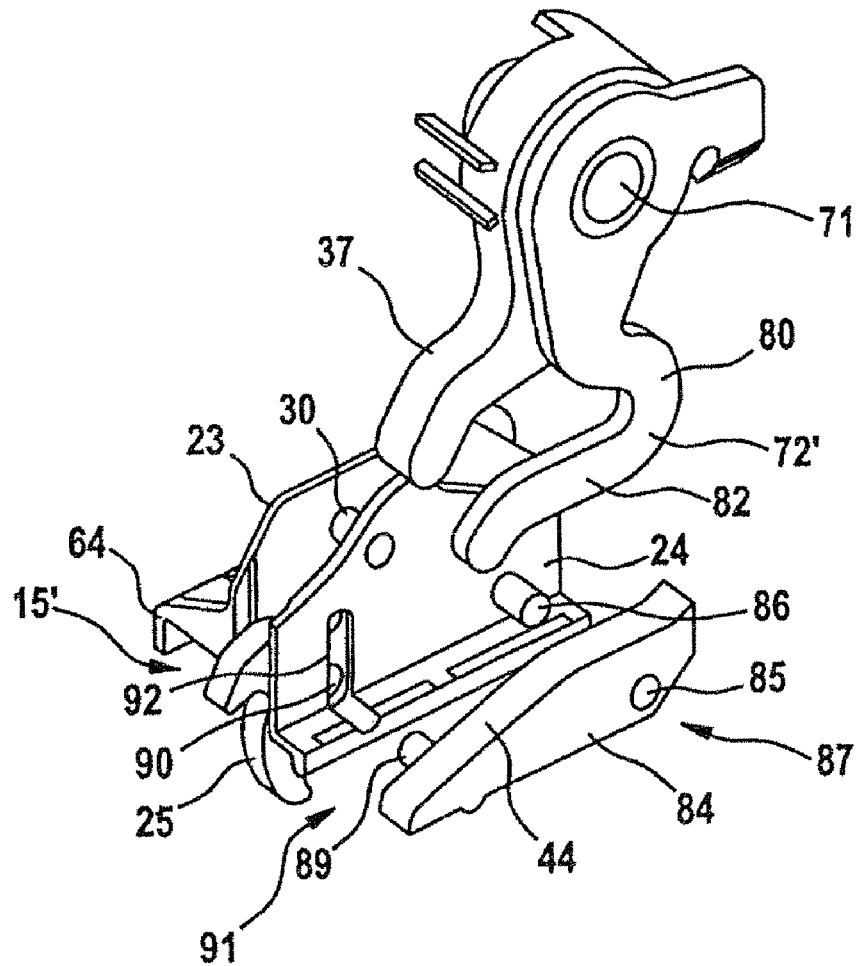
FIG. 6A is a perspective view of a further memory module in interplay with a comfort lever and a control lever, the control ramp for the comfort lever being configured as a movable rocker.

FIG. 6 is a respective three-dimensional view of a memory module 15' having an altered configuration of the second control ramp 44. Even the comfort lever 72' interacting with the second control ramp 44 is configured differently from FIG. 5. In particular, the comfort lever 72' has a molded arc 80 on which a horizontal lever arm 82 is arranged.

The second control ramp 44 is configured as a surface of a rocker 84. The rocker 84 has an opening 85 via which it can be attached to a journal 86, which is rigidly connected to the second wall 24, so as to be able to move in rotation. A first pivot joint of the rocker 84 is formed by means of the journal 86 and the opening 85.

At its free end remote from the first pivot joint 87, the rocker 84 has a further journal 89 which is inserted into an opening 90 in the movable safety catch 25 so as to be able to move in rotation. The journal 89 and the opening 90 in the safety catch 25 form a second pivot joint 91 of the rocker 84. In order to allow rotation of the free end of the rocker 84, the journal 89 of the second pivot joint 91 is guided in the second wall 24 by a circular arc-shaped opening 92 in the second wall 24.

Figure 6B:
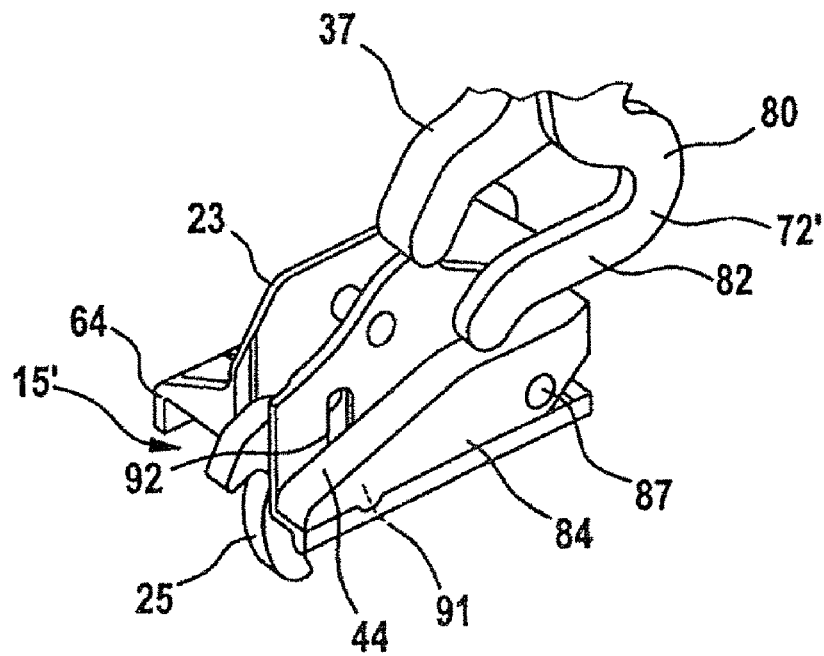
FIG. 6B is a perspective view of the memory module according to FIG. 6A from a different viewing angle.

FIG. 6B shows the mode of operation of the rocker 84 configured in this way. When the vehicle seat is reset toward the deposited memory module 15', the horizontal lever arm 82 of the comfort lever 72' climbs the second control ramp 44 of the rocker 84. This produces a downwardly oriented force on the free end, having the second pivot joint 91, of the rocker 84. This gives rise to a torque, thus allowing the rocker 84 to move anticlockwise in the first pivot joint 87. This downwardly oriented force, caused by the advancement of the comfort lever 72', on the safety catch 25 is transmitted via the journal of the second pivot joint 91. This increases the force holding the memory module 15 in the deposited position with respect to the bottom rail.

If the control lever 37 brings the safety catch 25 out of its locked position into a release position, the rocker 84 also moves with the safety catch 25. This movement is facilitated by the circular arc-shaped opening 92 in the second wall 24 of the memory module 15.

What is claimed is:

1. An adjusting system for a vehicle seat comprising
a bottom rail that is adapted to be rigidly attached to a vehicle,
a top rail that can be rigidly attached to the seat and is adapted to move along the bottom rail, and
a memory module that is either attached to the seat or to the vehicle and is adapted to move along the bottom rail,
wherein the memory module comprises a movable safety catch for forming a positional locking mechanism with the bottom rail, and
a means for forming a positional locking mechanism with a movable seat-mounted control lever, wherein the safety catch is adapted to be actuated by the seat-mounted control lever and is mounted in a cam-controlled manner so as to be able to rotate in a rolling bearing, the rolling bearing being formed by a bearing journal that is non-positively linked with an open seat.

2. The adjusting system as claimed in claim 1, further comprising a bearing for the purposes of cam control.

3. The adjusting system as claimed in claim 2, wherein the bearing is formed by a round web on which a running edge of the safety catch extends.

4. The adjusting system as claimed in claim 3, wherein the safety catch is guided between the rolling bearing and the bearing.

5. The adjusting system as claimed in claim 3, wherein the rolling bearing comprises a round recess which is remote from the bottom rail and in which the safety catch is mounted by means of an integrally formed tooth.

6. The adjusting system as claimed in claim 5, wherein the round recess is substantially U or V-shaped in its configuration.

7. The adjusting system as claimed in claim 3, wherein the bottom rail has openings that are separated from one another by webs and with which the safety catch engages in a first locked position.

8. The adjusting system as claimed in claim 7, wherein the safety catch has an indentation that is arranged between locking lugs and surrounds a web of the bottom rail in a second locked position.

9. The adjusting system as claimed in claim 7, wherein the running edge of the safety catch has a first recess for providing support in relation to the round web in a release position and a second recess, which is set apart from the first recess by a collar, for providing support in relation to the round web in the first locked position.

10. The adjusting system as claimed in claim 3, wherein the memory module has, as a means for forming a positional locking mechanism with the control lever, a recess for receiving at least a portion of the control lever.

11. The adjusting system as claimed in claim 10, wherein the recess is configured as part of a first control ramp for guiding the control lever.

12. The adjusting system as claimed in claim 11, wherein the recess is configured in such a way that the control lever received therein leads at the same time to releasing actuation of the safety catch.

13. The adjusting system as claimed in claim 11, wherein the safety catch is guided in a pocket-like receptacle formed by a first and by a second wall surface, the round 1web being mounted so as to connect the first and the second wall surface, a round recess in the rolling bearing being arranged between the first and the second wall surface, and the first control ramp being formed by the upper edge of a wall surface.

14. The adjusting system as claimed in claim 11, wherein the memory module has a second control ramp for guiding a movable seat-mounted comfort lever which is configured in such a way that the comfort lever releases the backrest when folded forward as it ascends onto the second control ramp.

15. The adjusting system as claimed in claim 14, wherein the second control ramp is formed integrally with or abuts the wall surface forming the first control ramp.

16. The adjusting system as claimed in claim 14, wherein the second control ramp is formed by the upper edge of a movable rocker which is stationarily articulated by means of a first pivot joint of the memory module and the free end of which is connected to the movable safety catch via a second pivot joint.

17. The adjusting system as claimed in claim 16, wherein the second pivot joint is arranged at a flat end of the rocker with the second control ramp rising.

18. The adjusting system as claimed in claim 16, wherein the rocker abuts a wall surface so as to be able to rotate by means of the first pivot joint and in that the rocker is connected to the safety catch via the second pivot joint through a circular arc-shaped opening in the wall surface.

* * * * *